United States Patent
Ikeda et al.

[15] 3,649,179
[45] Mar. 14, 1972

[54] PROCESS FOR THE REMOVAL OF UNREACTED AMMONIA

[72] Inventors: Yoneichi Ikeda; Michio Hattori; Yutaka Kiyomiya, all of Yokohama, Japan

[73] Assignee: Nitto Chemical Industry Co., Ltd., Tokyo, Japan

[22] Filed: Nov. 8, 1968

[21] Appl. No.: 774,446

[30] Foreign Application Priority Data

Nov. 13, 1967 Japan...................................42/72588

[52] U.S. Cl..............................................................23/119
[51] Int. Cl...........................................................C01c 1/12
[58] Field of Search............................23/119, 196; 260/465

[56] References Cited

UNITED STATES PATENTS

| | | | |
|---|---|---|---|
| 3,433,822 | 3/1969 | Hausweiler et al. | 260/465 |
| 3,462,477 | 8/1969 | Caporali et al. | 260/465 |

FOREIGN PATENTS OR APPLICATIONS 1,020,088  2/1966  Great Britain.........................260/465

*Primary Examiner*—Oscar R. Vertiz
*Assistant Examiner*—G. O. Peters
*Attorney*—Cushman, Darby & Cushman

[57] ABSTRACT

Unreacted ammonia resulting from the reaction producing acrylonitrile by the so-called ammoxidation of propylene is removed by cooling the reaction product by direct contact with quenching water while adding an acid to remove or recover the unreacted ammonia in the form of a salt thereof. The cooling is effected stepwise in two or more stages, thereby to increase the concentration of the ammonium salt solution withdrawn out of the system at the first cooling stage, and considerably reduce the cost of the recovery of the ammonium salt.

6 Claims, 2 Drawing Figures

PATENTED MAR 14 1972 3,649,179
FIG. 1
FIG. 2
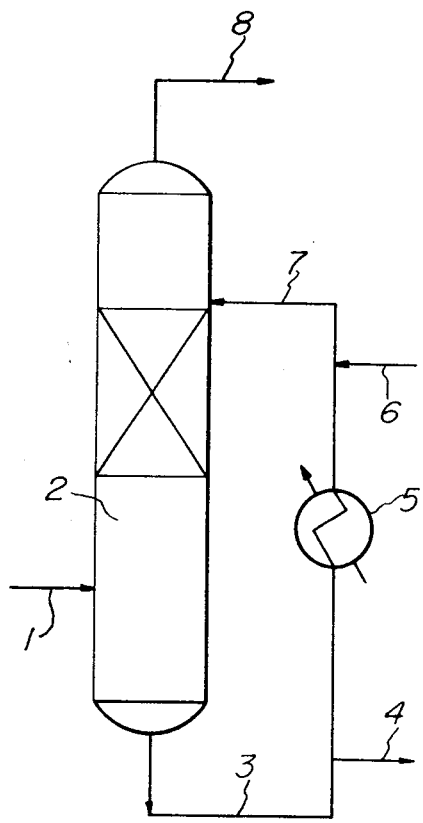
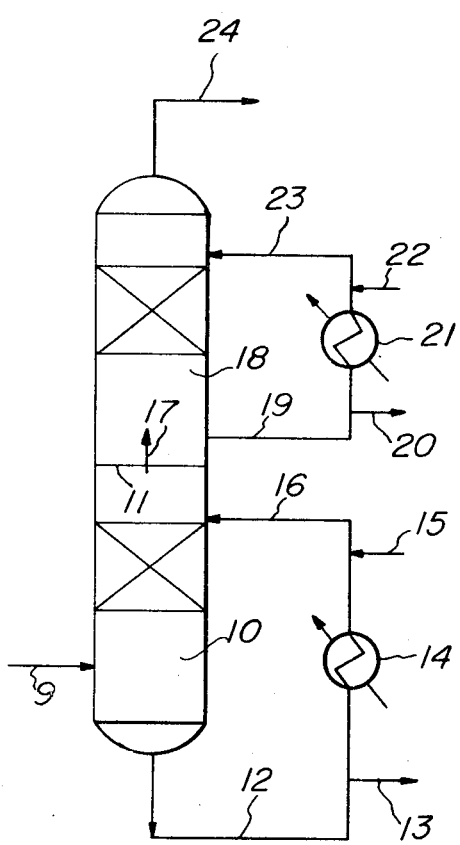
INVENTORS
Yoneichi Ikeda
Michio Hattori
Yutaka Kiyomiya
BY Cushman, Darby & Cushman
ATTORNEYS

PROCESS FOR THE REMOVAL OF UNREACTED AMMONIA

The present invention relates to a process for the removal of unreacted ammonia, and more particularly to an improvement in the process for the removal of the unreacted ammonia resulting from the reaction for preparing acrylonitrile, the so-called ammoxidation of propylene by contacting a gaseous phase mixture of ammonia, molecular oxygen and propylene with a catalyst at an elevated temperature.

As the above-mentioned ammoxidation reaction is effected at an elevated temperature, the reaction product is ordinarily, after cooling, subjected to the recovering and purifying operations.

The cooling of the reaction product is effected by direct contact with quenching water. Frequently, an acid is added to quenching water to neutralize the unreacted ammonia in the course of the cooling operation, so that the unreacted ammonia is removed in the form of a salt thereof. At that time, major portion of the water contained in the reaction product is condensed and removed.

The recovery of the unreacted ammonia in the form of a salt thereof in such manner is economically very important.

The present invention is to provide a process of removing the unreacted ammonia in the form of its salt solution of a concentration higher than that obtained in the conventional processes, with the purpose of considerable reduction in the cost of the recovery of the salt.

As mentioned above, the so-called propylene ammoxidation reaction is effected by contacting a gaseous phase mixture of ammonia, molecular oxygen and propylene with a catalyst at an elevated temperature to form acrylonitrile, whereupon the reaction product is contacted directly with quenching water for cooling and, at the same time, an acid is added thereto so that the unreacted ammonia is removed in the form of the salt. According to the present invention, the cooling operation is conducted in two or more stages in the above-mentioned process for the removal of the unreacted ammonia from the reaction product. In the first cooling stage, the temperature is maintained at such a degree as to condense some of the water present in the reaction product and, at the same time, an acid is added in an amount required for neutralization of the unreacted ammonia to be removed, thereby recovering the unreacted ammonia in the form of its salt solution of high concentration. In the second and/or further cooling stages, the remaining major portion of the water present in the reaction product is condensed.

With the present process wherein the cooling operation is carried out in two or more stages, it is required that the first stage-cooling is conducted at a temperature higher than that employed in the conventional process using only one stage for cooling. For this reason it is apprehended that the acrylonitrile loss due to polymerization thereof might be increased. However, as a result of the experiments by the inventors, it has unexpectedly been found that, according to the present process, any increase in the loss of acrylonitrile due to polymerization thereof is not recognized as compared with the conventional process.

The recovery of acrylonitrile which is formed by reacting propylene, ammonia and molecular oxygen in the presence of a catalyst is effected by absorption with water in an absorption tower. Yet, before being led to the absorption tower, the reaction product gas is passed to a quenching tower, in which the product gas is quenched to near the room temperature by direct contact with quenching water and, at the same time, an acid is added to quenching water to neutralize the unreacted ammonia contained in the reaction product gas, thereby to remove the unreacted ammonia as an ammonium salt.

The concentration of the ammonium salt solution withdrawn from the bottom portion of the quenching tower is determined depending on the various factors, such as the amount of water formed by the reaction, the amount of the unreacted ammonia, the temperature and the pressure of the effluent gas withdrawn at the top of the quenching tower, etc. However, since these factors are usually constant except the temperature of the overhead effluent gas withdrawn from the quenching tower, the concentration of the ammonium salt solution is determined depending solely on the temperature of the overhead effluent gas from the quenching tower.

The process according to the present invention will be in more detail described with reference to the drawings. The drawings show the basic flow sheets of a preferred embodiment of the process of this invention and the conventional process. Accordingly, apparatuses and/or devices as not required for understanding of the principle of the present invention are omitted from the drawings.

Referring now to FIG. 1, there is shown a flow sheet of the conventional process, in which the high temperature-reaction product gas is supplied through a pipe 1 to a quenching tower 2 at its lower portion and is contacted countercurrently with a quenching liquid introduced through a pipe 7 to the quenching tower 2 at its upper portion. The reaction product gas thus cooled is withdrawn through a pipe 8 from the top of the tower and led to an absorption tower. The temperature of the gas thus withdrawn overhead depends on the temperature and the amount of the cycling quenching liquid, the contact time of the gas with the cycling quenching liquid within the tower, etc. At the bottom of the quenching tower 2 is withdrawn through a pipe 3 a liquid having a temperature higher than that of the quenching liquid to be supplied through the pipe 7, and a portion of the liquid is withdrawn out of the circulation system through a pipe 4 in an amount corresponding approximately to the amount of the condensed water vapor contained in the reaction product gas. However, the remaining major portion of the liquid is cooled by a heat exchanger 5 and recycled. The above-mentioned withdrawal of the liquid through the pipe 4 to the outside of the circulation system serves to maintain the liquid level in the bottom portion of the quenching tower 2 constant.

During the course of such circulation, an acid is added into the cycling quenching liquid through a pipe 6 so as to remove the unreacted ammonia present in the reaction product gas.

The overhead effluent gas from the quenching tower 2 is saturated with water formed in the reaction and, therefore, the amount of water condensed in the quenching tower is a difference between the amount of water formed by the reaction and the amount of water contained in the effluent gas from the top of the quenching tower. At the same time, the minor portion of the reaction product gas including acrylonitrile and the like also is condensed therein.

In the absorption tower in which acrylonitrile contained in the overhead effluent gas from the quenching tower is absorbed by water, the absorbing operation is conducted preferably at a lower temperature so as to achieve a complete absorption of acrylonitrile. For this reason, the higher temperature of the gas introduced to the absorption tower through the pipe 8 from the top of the quenching tower is undesirable.

The lower the temperature of the gas withdrawn through the pipe 8, the more the amount of water condensed in the quenching tower. Accordingly, the concentration of the ammonium salt in the solution withdrawn out of the system through the pipe 4 is lowered, and the cost required for the recovery of ammonium salt from the solution becomes considerably higher. According to the conventional process, the operation is usually carried out under such a condition that the temperature of the overhead effluent gas from the quenching tower, namely, the temperature of the gas introduced into the absorption tower, is in the range of 30° to 70° C.

By contrast, according to the present invention, the cooling of the reaction product gas in the quenching tower is effected stepwise in two or more stages to obtain a high concentration solution of an ammonium salt, for example, ammonium sulfate. One embodiment of the present invention, in which the cooling is effected stepwise in two stages, will be in detail described hereinbelow, by way of example.

Referring now to FIG. 2, there is shown a flow sheet according to the present invention, in which employed is a quenching tower which is divided into two compartments, namely the upper and lower ones, by a partition plate 11. In both compartments a means for contacting a gas with a liquid is provided.

Any type of contacting means can be employed in the present invention.

The reaction product gas is fed through a pipe 9 to the lower section of a lower compartment 10 of a quenching tower (hereinafter referred to as the first quenching compartment). The cycling water to the first quenching compartment is supplied through a pipe 16 at the upper portion of said compartment and withdrawn at its bottom through a pipe 12. A portion of the cycling liquid thus withdrawn at the bottom, whose amount corresponds approximately to the amount of the condensed water, is withdrawn out of the circulation system through a pipe 13, and the remaining major portion of the cycling liquid is cooled by a heat exchanger 14 and recycled.

The unreacted ammonia contained in the reaction product gas is neutralized with an acid supplied through a pipe 15 to the cycling liquid and removed as an ammonium salt.

The reaction product gas cooled in the first quenching compartment is introduced through a pipe 17 into the lower section of an upper compartment 18 of the quenching tower (hereinafter referred to as the second quenching compartment). The temperature of the gas introduced can be changed by controlling the temperature and/or amount of the cycling liquid of the first quenching compartment, the contact time of gas and liquid within the first quenching compartment, etc.

From the top of the second quenching compartment is supplied through a pipe 23 a cycling liquid, which is withdrawn at the lower section of said compartment through a pipe 19. A portion of the liquid, whose amount corresponds approximately to the amount of the condensed water, is withdrawn through a pipe 20 out of the circulation system, and the remaining major portion of the liquid is cooled by a heat exchanger 21 and recycled. If desired, a small amount of an acid may be added into the cycling liquid to the second quenching compartment through a pipe 22. The reaction product gas which has been further cooled in the second quenching compartment is withdrawn through a pipe 24 from the top of said compartment, and subsequently passed to an absorption tower. The temperature of the gas introduced to the absorption tower usually is in the same range as defined in the conventional process.

The concentration of ammonium salt in the liquid or solution withdrawn out of the system through the pipe 13 at the first quenching compartment depends on the amount of the water condensed in the first quenching compartment and the amount of the unreacted ammonia contained in the reaction product gas. Therefore, if the amount of water formed by the reaction, the amount of the unreacted ammonia and the pressure at the top of the first quenching compartment are constant, the above-mentioned concentration depends solely on the temperature of the overhead effluent gas from the first quenching compartment. Consequently, a desired concentration of the ammonium salt can be obtained by controlling the temperature of the overhead effluent gas from the first quenching compartment. The control of the temperature of the overhead effluent gas from the first quenching compartment is effected by controlling the temperature of the cycling liquid at the outlet of the heat exchanger 14, the amount of the cycling liquid and the gas-liquid contact time, etc. During the reaction product gas-cooling operation in the first quenching compartment, a small portion of acrylonitrile is condensed from the reaction products. However, by maintaining the overhead effluent gas from the first quenching compartment at a relatively high temperature, the amount of condensed acrylonitrile can be reduced to a very small degree. Thus, an operation for recovering condensed acrylonitrile from the ammonium salt solution, as in the conventional process, is not necessary in the present invention.

As mentioned above, the process according to the present invention is characterized by conducting the cooling of the reaction product gas stepwise in two or more stages. In accordance with the present invention, the stepwise cooling can be effected in a quenching tower having two or more quenching compartments, or two or more quenching towers separately.

Any acid can be used for neutralization of the unreacted ammonia in the present invention. However, in view of the utility of the ammonium salt, a mineral acid, such as sulfuric acid, hydrochloric acid, phosphoric acid, nitric acid or the like, preferably sulfuric acid is desirable. The concentration of the acid employed is not critical, but in the case of sulfuric acid, concentrated sulfuric acid is preferable to use not only for preventing the corrosion of the apparatus but also for increasing the concentration of the ammonium salt in the withdrawn liquid. The acid is added in an amount sufficient to neutralize the unreacted ammonia. In order to prevent the polymerization of polymerizable components contained in the reaction product gas, particularly acrylonitrile, it is required to maintain acidic the atmosphere in the quenching tower by further adding a small amount of acid during the course of cooling in the second and/or further stages.

The cooling operation may be conducted under any of reduced, atmospheric and elevated pressure. In general, the atmospheric pressure is employed.

As is seen from the foregoing description, the present invention pertains to a process for the removal of the unreacted ammonia in the form of an ammonium salt solution, wherein the solution is recovered in high concentration from the first quenching compartment or tower. In order to obtain the ammonium salt solution withdrawn out of the system in a desirable concentration when the water concentration and the unreacted ammonia concentration in the reaction product gas, the pressure at the top of the first quenching compartment or tower, etc., are changed, it is obviously necessary to change the temperature of the overhead effluent gas from the first quenching compartment or tower.

For stable operation, it is necessary to keep the concentration of the ammonium salt solution withdrawn out of the system at the first quenching compartment or tower below the saturation. By controlling the concentration of the solution below the saturation, it is possible to prevent the deposition or crystallization of ammonium salt within the cooling system. The lower limit of the concentration is preferably in a range of 10 to 15 percent by weight in view of the cost required for recovering the ammonium salt by a further concentrating operation or the like. For example, in the case of sulfuric acid, the concentration of ammonium sulfate solution withdrawn out of the system at the first quenching compartment or tower is preferably in a range of 15 to 40 percent by weight.

In order that the invention may be well understood, the comparative example and the examples embodying this invention are given in the following.

COMPARATIVE EXAMPLE

A quenching tower with a height of 1,500 mm. and an internal diameter of 200 mm. was used, in which 10-mm. $\phi$ porcelain Raschig rings were packed up to a height of 500 mm. Into the quenching tower through which water was cycled at a rate of 380 kg./hr. was introduced the reaction product gas of a temperature of 230° C. at a rate of 12.518 kg./hr. At the same time, sulfuric acid was added to the cycling liquid at a rate of 110 g./hr. The pressure at the top of the quenching tower was 1,180 mmHg. The introduced reaction product gas had been prepared by reacting propylene, ammonia and air in the presence of a catalyst and contained 0.27 percent by weight of ammonia and 16.50 percent by weight of water.

The amount of the cooling water in a heat exchanger was controlled so that the temperature of the overhead effluent gas from the quenching tower was maintained at 41° C. and, at the same time, a portion of the cycling liquid was withdrawn out of the system so that the liquid level in the bottom portion of the quenching tower was maintained constant.

When the quenching system was brought into a stationary state, the concentration of the ammonium sulfate in the cycling liquid withdrawn out of the system was 7.0 percent by weight.

The temperature of the cycling liquid at the inlet of the quenching tower was 39° C. and the temperature at the outlet was 55° C.

In the examples the temperature of the reaction product gas leaving the first cooling stage ranges from a low of 65° C. in example 2 to a high of 75° C. in example 1.

EXAMPLE 1

Two quenching towers having each a height of 1,000 mm. and an internal diameter of 200 mm. were used, in each of which 10-mm. $\phi$ porcelain Raschig rings were packed up to a height of 300 mm. The quenching towers were connected in a series. Each of these towers was provided with a liquid cycling line including a heat exchanger. The cycling liquid was run at a rate of 380 kg./hr. in both quenching towers respectively. At the lower portion of the first quenching tower was introduced the same reaction product gas as described in Comparative Example at a rate of 12.518 kg./hr. At the same time, sulfuric acid was added at a rate of 110 g./hr. to the cycling liquid of the first quenching tower and at a rate of 30 g./hr. to the cycling liquid of the second quenching tower, respectively. The pressure at the top of the first quenching tower was 1,230 mmHg.

The amounts of the cooling water in the heat exchangers of the first quenching tower and the second quenching tower were each controlled so that the temperature of the gas led from the top of the first quenching tower to the bottom of the second quenching tower and the temperature of the overhead effluent gas from the second quenching tower were maintained at 75° C. and 41° C., respectively. A portion of the cycling liquid was withdrawn out of the system so that the liquid levels of the first quenching tower and the second quenching tower were each maintained constant.

When the cycling systems in the first quenching tower and the second quenching tower were each brought into stationary states respectively, the concentration of the ammonium sulfate in the cycling liquid withdrawn out of the system at the first quenching tower was 30.1 percent by weight.

The temperature of the cycling liquid at the inlet of the first quenching tower was 73° C. and the temperature at the outlet was 80° C. The temperature of the cycling liquid at the inlet of the second quenching tower was 40° C. and the temperature at the outlet was 47° C.

EXAMPLE 2

Two quenching towers having each a height of 1,000 mm. and an internal diameter of 200 mm. were used, in each of which 10mm. $\phi$ porcelain Raschig rings were packed up to a height of 300 mm. Two quenching towers were connected in a series. Each of these towers was provided with a liquid cycling line including a heat exchanger. The cycling liquid was run at a rate of 380 kg./hr. in both quenching towers respectively. Into the first quenching tower at its lower portion was introduced the reaction product gas of a temperature of 230° C. at a rate of 12.518 kg./hr. At the same time, sulfuric acid was added at a rate of 350 g./hr. to the cycling liquid of the first quenching tower and at a rate of 50 g./hr. to the cycling liquid of the second quenching tower, respectively. The pressure at the top of the first quenching tower was 1,240 mmHg. The introduced reaction product gas had been prepared by reacting propylene, ammonia and air in the presence of a catalyst and contained 0.85 percent by weight of ammonia and 15.40 percent by weight of water.

The amounts of the cooling water in the heat exchangers of the first quenching tower and the second quenching tower were each controlled so that the temperature of the gas led from the top of the first quenching tower to the bottom of the second quenching tower and the temperature of the overhead effluent gas from the second quenching tower were each maintained at 65° C. and 45° C., respectively. A portion of the cycling liquid was withdrawn out of the system so that the liquid levels of the first quenching tower and the second quenching tower were each maintained constant.

When the cycling systems in the first quenching tower and the second quenching tower were each brought into stationary states, the concentration of the ammonium sulfate in the cycling liquid withdrawn out of the system at the first quenching tower was 29.6 percent by weight.

The temperature of the cycling liquid at the inlet of the first quenching tower was 64° C. and the temperature at the outlet was 71.5° C. The temperature of the cycling liquid at the inlet of the second quenching tower was 44° C. and the temperature at the outlet was 46.5° C.

What is claimed is:

1. In a process for the removal of the unreacted ammonia resulting from the reaction producing acrylonitrile which comprises contacting a gaseous phase mixture of ammonia, molecular oxygen and propylene with a catalyst at an elevated temperature and subsequently cooling the resulting reaction product gas by direct contact with quenching water while adding an acid to the quenching water, an improvement comprising effecting said cooling stepwise in at least two stages, adding an acid to the first cooling stage in an amount enough to neutralize the unreacted ammonia while maintaining a temperature of an effluent gas from the first cooling stage to a degree to condense a portion of water contained in the reaction product gas, thereby recovering the unreacted ammonia in the form of its salt solution of high concentration, and condensing the major portion of water contained in the reaction product gas in the succeeding cooling stage.

2. A process according to claim 1, wherein a small amount of the acid is further added in the succeeding cooling stages.

3. A process according to claim 2, wherein sulfuric acid is employed as the acid for neutralizing the unreacted ammonia.

4. A process according to claim 3, wherein the concentration of ammonium sulfate formed by the neutralization and contained in the liquid withdrawn out of the first cooling stage is in a range of 15 to 40 percent by weight.

5. A process according to claim 1 wherein the acid is selected from the group consisting of sulfuric acid, hydrochloric acid, phosphoric acid and nitric acid and the temperature of the reaction product gas leaving the first cooling stage is 65°–75 C.

6. A process according to claim 1 wherein the acid is selected from the group consisting of sulfuric acid, hydrochloric acid, phosphoric acid and nitric acid.

* * * * *